United States Patent
Laskaris et al.

(10) Patent No.: US 6,442,949 B1
(45) Date of Patent: Sep. 3, 2002

(54) CRYONGENIC COOLING REFRIGERATION SYSTEM AND METHOD HAVING OPEN-LOOP SHORT TERM COOLING FOR A SUPERCONDUCTING MACHINE

(75) Inventors: Evangelos Trifon Laskaris; Robert Adolph Ackermann, both of Schenectady; Yu Wang, Clifton Park, all of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/902,586

(22) Filed: Jul. 12, 2001

(51) Int. Cl.[7] ................................................. F25B 19/00
(52) U.S. Cl. ........................................... 62/51.1; 62/505
(58) Field of Search .................................... 62/51.1, 505

(56) References Cited

U.S. PATENT DOCUMENTS 4,884,409 A * 12/1989 Quack et al. ................ 62/51.1
5,187,938 A * 2/1993 Mraz et al. .................. 62/51.1
5,606,870 A * 3/1997 Lester .......................... 62/51.1
5,848,532 A * 12/1998 Gamble et al. .............. 62/51.1

FOREIGN PATENT DOCUMENTS

JP            10-311618        11/1998

* cited by examiner

*Primary Examiner*—Ronald Capossela
(74) *Attorney, Agent, or Firm*—Nixon & Vanderhye P.C.

(57) ABSTRACT

A cooling fluid system is disclosed for providing cryogenic cooling fluid to a high temperature super-conducting machine, wherein said system includes a main cooling system (52, 88) and a second cooling system, said second cooling system comprising a storage device having a first cryogenic fluid; at least one cooling coupling in fluid communication with the first cryogenic fluid from the storage device and a second cryogenic fluid flowing through the main cooling system.

24 Claims, 5 Drawing Sheets

CRYONGENIC COOLING REFRIGERATION SYSTEM AND METHOD HAVING OPEN-LOOP SHORT TERM COOLING FOR A SUPERCONDUCTING MACHINE

BACKGROUND OF THE INVENTION

The present invention relates generally to a cryogenic cooling system for synchronous machine having a rotor with a high temperature superconducting (HTS) component. More particularly, the present invention relates to a cooling system to provide cryogenic fluid to the rotor of an HTS machine, and to re-cool used cooling fluid returned from the rotor.

Superconducting rotors have their superconducting coils cooled by liquid helium, with the used helium being returned as room-temperature gaseous helium. Using liquid helium for cryogenic cooling requires continuous reliquefaction of the returned, room temperature gaseous helium. Thus, reliquefaction poses significant reliability problems and requires significant auxiliary power for the helium cooling system. Accordingly, there is a need for a cryogenic cooling system that reliquefies the hot, used cooling fluid returned from the rotor. The reliquefied cooling fluid should then be available for re-use to continuously cool the HTS rotor.

A cryorefrigeration system for a superconducting electric machine provides cooling fluids to cool to cryogenic temperatures, and to maintain the superconducting characteristics of components of the machine, e.g., superconducting rotor coils. For economic reasons, electric machines are expected to have high availability and reliability. However, some of the cryorefrigeration components, such as a cold-head and compressors in a Gifford-McMahon (GM) refrigeration system, have short operational life spans due to wear and experience cooling fluid leakage as result of reciprocating mechanical motion of the components of the cooling system. The reliability of the cold head and Gifford-McMahon systems may not be sufficient for the high reliability requirements of certain machines, especially for industrial power machines such as power generators.

High temperature superconducting generators require highly reliable, low cost cryorefrigeration equipment to be viable as commercial products. Redundant cryorefrigerator components have in the past been used to achieve high reliability with existing cryorefrigeration equipment. The inadequate reliability of individual cooling components and the requirement that HTS rotors have an uninterrupted supply of cooling fluid have in the past necessitated that redundant components be included in cryorefrigeration systems for HTS rotors.

Cooling systems must continuously operate in a machine having superconducting components. When a cryogenic cooling component fails, cooling fluid may not properly flow to the machine and superconducting components in the machine warm up. These warmed components lose their superconducting characteristics and the machine operation is interrupted due to loss of superconductivity. Accordingly, cooling systems with inadequate reliability will cause machine shut-downs that are unexpected and undesirable. To maintain system availability, a fully redundant cooling system path has typically been used in the past to improve the reliability of the cooling system. Due to redundant system components, the cost of the cryorefrigeration systems for superconducting machines is nearly doubled. Moreover, existing cryorefrigeration systems require frequent maintenance due to their inadequate reliability and system redundancies. Accordingly, the capital and operating cost of these cryogenic cooling systems is relatively high.

Typical cryorefrigerator equipment for the temperature range of 20–30° Kelvin (K) is based on Gifford McMahon cold head technology that has limited refrigerator capacity and requires maintenance about once a year. Multiple units can be combined to increase the capacity and reliability of the system at the expense of increased cost. In addition to multiple (redundant) cold heads, closed loop circulation systems require either cold re-circulation fans, or external warm re-circulation fans with counter-flow highly efficient heat exchangers. These components add cost and complexity to the system when redundancy for high reliability is required, unless all components can be built with six sigma quality.

The purchase and operating costs of existing cryorefrigeration systems significantly adds to the cost of machines having HTS rotors. These high costs have contributed to the commercial impracticalities of incorporating HTS rotors into commercially marketable synchronous machines. Accordingly, there is a substantial and previously unmet need for cryorefrigeration systems that are less expensive, inexpensive to operate and provide a reliable supply of cryogenic cooling fluid to a HTS rotor.

Synchronous electrical machines having field coil windings include, but are not limited to, rotary generators, rotary motors, and linear motors. These machines generally comprise a stator and rotor that are electromagnetically coupled. The rotor may include a multi-pole rotor core and coil windings mounted on the rotor core. The rotor cores may include a magnetically-permeable solid material, such as an iron forging.

BRIEF SUMMARY OF THE INVENTION

A short-term temporary cooling system for a superconducting machine is disclosed. The temporary cooling system operates during maintenance or a failure of a main cooling system component, and until the main cooling system can be serviced and be made operational. The temporary cooling system has a lower initial cost and lower lifetime operational cost as compared to the costs of a conventional redundant cooling path system.

The temporary cooling system may provide several hours of cryogenic cooling of the cooling fluid passing through the SC machine. These hours of cooling while the main cooling system is at least partially inoperative allow for continued operation of the superconducting machine. While the temporary cooling system operates, an established superconducting machine service network should be able to service the failed main cooling system components and resort the operation of the main cooling system (and then turn-off the temporary cooling system). Accordingly, the temporary cooling system provides continued cryogenic cooling fluid for a SC machine for a defined time period, such as several hours.

In a first embodiment, the invention is a cooling fluid system for providing cryogenic cooling fluid to a high temperature superconducting machine, wherein said system includes a main cooling system (52, 88) and a second cooling system, said second cooling system comprising: a storage device having a first cryogenic fluid; at least one cooling coupling in fluid communication with the first cryogenic fluid from the storage device and a second cryogenic fluid flowing through the main cooling system, and said second cooling system has a first operational mode during which the first cryogenic fluid does not flow through the at least one cooling coupling, and a second operational mode during which the first cryogenic fluid does flow through the at least one cooling coupling, wherein said second cooling system is switched from the first operational mode to the second operational mode when a failure occurs in the main cooling system.

In another embodiment, the invention is a cooling fluid system coupled to a high temperature superconducting rotor for a synchronous machine, said system comprising: a main cooling system that further comprises a re-circulation compressor; an inlet line providing a fluid passage for a second cooling fluid flowing from the re-circulation compressor to the rotor, wherein the inlet line passes through a cold head unit; and a temporary cooling system that further comprises: a storage tank for a first cryogen fluid; at least one heat exchanger in fluid communication with said storage tank and said inlet line, and a valve between the tank and at least one heat exchanger, said valve having an open position allowing the first cryogen fluid to flow from the tank to the at least one heat exchanger and a closed position isolating the first cryogen fluid from the at least one heat exchanger, wherein the open position of the valve is selected when the cold head unit is disabled and said closed position is selected when the cold head unit is operating to cool the second cryogen cooling fluid.

In a further embodiment, the invention is a method for cooling a super-conducting machine using a main cooling system and a temporary cooling system, comprising the steps of: storing a first cryogenic cooling fluid in said temporary cooling system; circulating a second cryogenic cooling fluid between said main cooling system and said machine to cryogenically cool superconducting components of the machine; cooling the second cryogenic cooling fluid with a cooling unit in said main cooling system and at the same time thermally isolating the first cryogenic cooling fluid from said second cryogenic cooling fluid; while said cooling unit is disabled, allowing the first cryogenic cooling fluid to cryogenically cool the second cooling fluid.

BRIEF DESCRIPTION OF THE DRAWINGS

The accompanying drawings in conjunction with the text of this specification describe an embodiment of the invention.

DETAILED DESCRIPTION OF THE INVENTION

Figure 1:
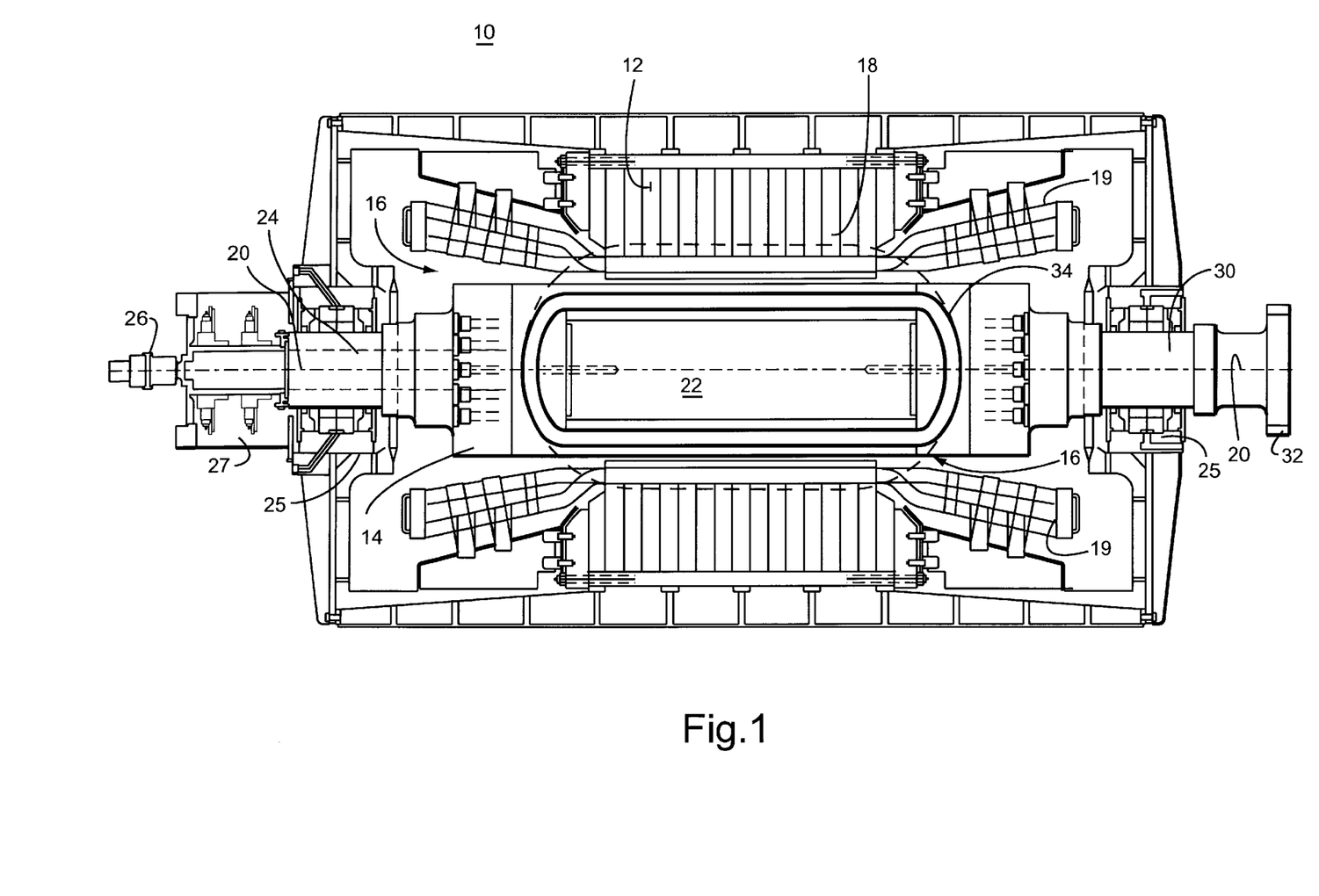
FIG. 1 is a schematic side view of schematic superconducting (SC) rotor shown within a stator.

FIG. 1 shows an exemplary synchronous generator machine 10 having a stator 12 and a rotor 14. The rotor includes field winding coils 34 that fit inside the cylindrical rotor vacuum cavity 16 of the stator. The rotor 14 fits inside the rotor vacuum cavity 16 of the stator. As the rotor turns within the stator, a magnetic field 18 (shown by dotted lines) generated by the rotor and rotor coils moves through the stator and creates an electrical current in the windings of the stator coils 19. This current is output by the generator as electrical power.

The rotor 14 has a generally longitudinally-extending axis 20 and a generally solid rotor core 22. The solid core 22 has high magnetic permeability, and is usually made of a ferromagnetic material, such as iron. In a low power density superconducting machine, the iron core of the rotor is used to reduce the magnetomotive force (MMF), and, thus, minimize the coil winding usage. For example, the iron of the rotor can be magnetically saturated at an air-gap magnetic field strength of about 2 Tesla.

The rotor 14 supports a generally longitudinally-extending, race-track shaped high temperature superconducting (HTS) coil winding. HTS coil winding may be alternatively a saddle-shape coil or have some other coil winding shape that is suitable for a particular HTS rotor design. The cooling system disclosed here may be adapted for coil winding and rotor configurations other than a race-track coil mounted on a solid core rotor.

The rotor includes end shafts 24, 30 that bracket the core 22 and are supported by bearings 25. The collector end shaft 24 has a cryogen transfer coupling 26 to a source of cryogenic cooling fluid used to cool the SC coil windings in the rotor. The cryogen transfer coupling 26 includes a stationary segment coupled to a source of cryogen cooling fluid and a rotating segment which provides cooling fluid to the HTS coil. An exemplary cryogen transfer coupling is disclosed in commonly-owned and copending U.S. patent application Ser. No. 09/854,931, filed May 15, 2001), entitled "Synchronous Machine Having Cryogenic Gas Transfer Coupling to Rotor With Super-conducting Coils," the entirely of which is incorporated by reference. The collector end shaft may also include collector rings 27 to connect the rotor coil 34 to an external electrical device or power supply. The drive end shaft 30 may have a power turbine coupling 32.

Figure 2:
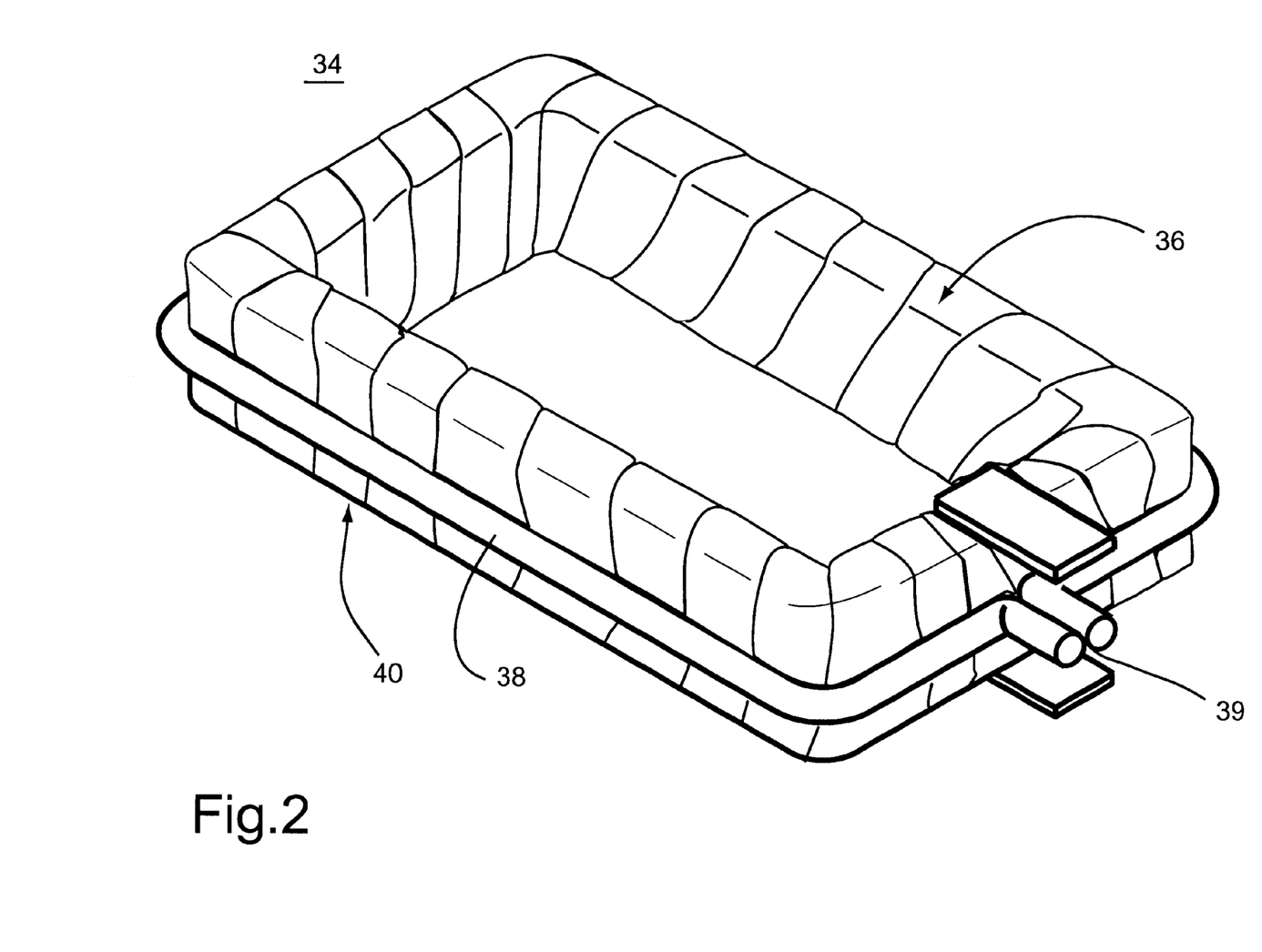
FIG. 2 is a schematic perspective view of a race-track SC coil having cooling gas passages.

FIG. 2 shows an exemplary HTS race-track field coil winding 34. The SC field winding 34 of the rotor includes a high temperature superconducting coil 36. Each HTS coil includes a high temperature super-conductor, such as a BSCCO ($Bi_xSr_xCa_xCu_xO_x$) conductor wires laminated in a solid epoxy impregnated winding composite. For example, a series of BSCCO 2223 wires may be laminated, bonded together and wound into a solid epoxy impregnated coil.

HTS wire is brittle and easy to be damaged. The HTS coil is typically layer wound with HTS tape, then epoxy impregnated. The HTS tape is wrapped in a precision coil form to attain close dimensional tolerances. The tape is wound around in a helix to form the race-track SC coil 36.

The dimensions of the race-track coil are dependent on the dimensions of the rotor core. Generally, each race-track coil encircles the magnetic poles of the rotor core, and is parallel to the rotor axis. The HTS coil windings are continuous around the race-track. The coils form a resistance free current path around the rotor core and between the magnetic poles of the core.

Fluid passages 38 for cryogenic cooling fluid are included in the coil winding 34. These passages may extend around an outside edge of the SC coil 36. The passageways provide cryogenic cooling fluid to the coils and remove heat from those coils.

The cooling fluid maintains the low temperatures, e.g., 27° K, in the SC coil winding needed to promote superconducting conditions, including the absence of electrical resistance in the coil. The cooling passages have input and output ports 39 at one end of the rotor core. These ports 39 connect to cooling passages 38 on the SC coil to the cryogen transfer coupling 26.

Figure 3:
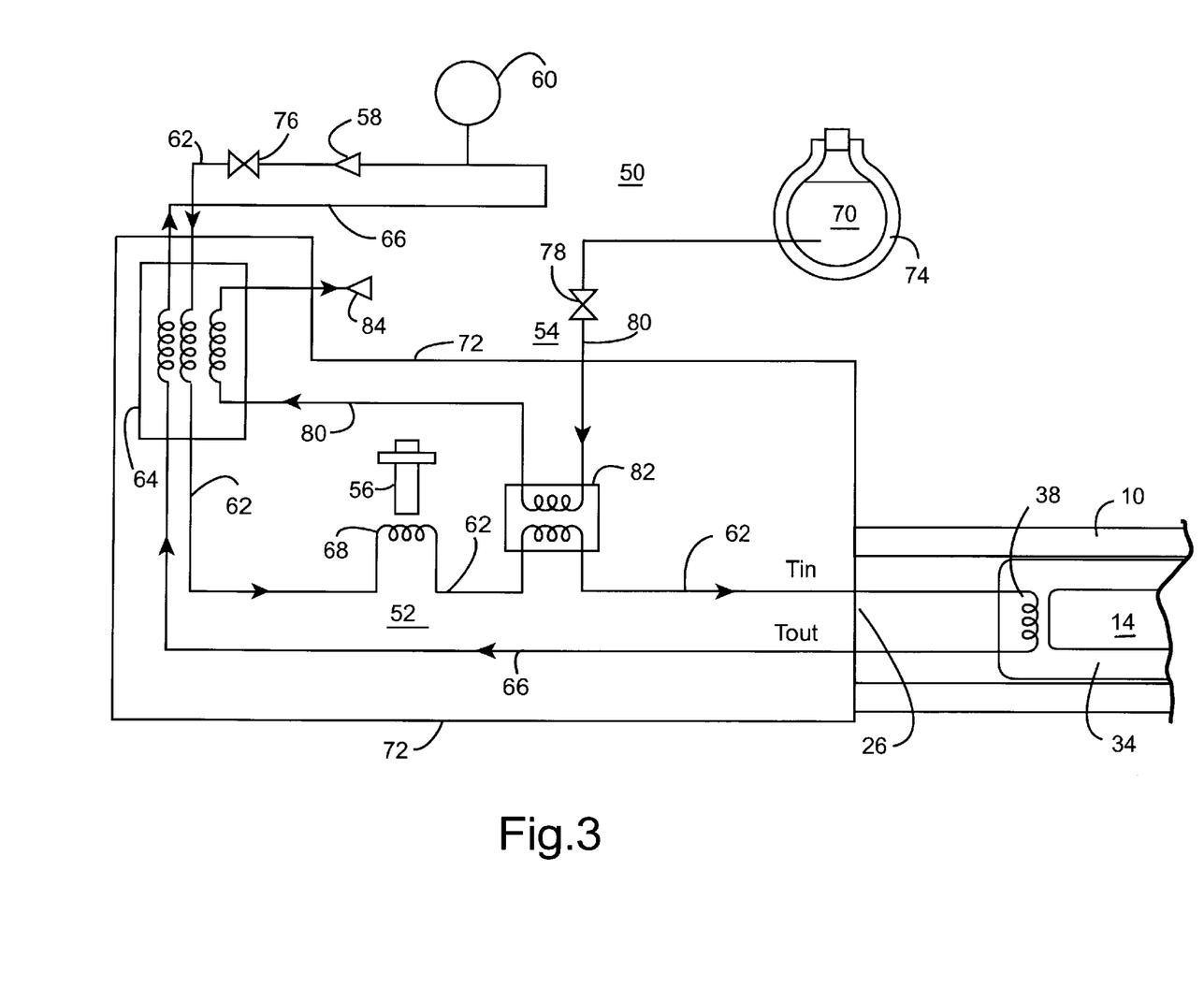
FIG. 3 is a schematic diagram of a cryogenic cooling system to supply cooling fluid to a SC rotor.

FIG. 3 is a schematic diagram of a cryorefrigeration system 50 for a HTS generator 10. The system includes a main cryogen cooling system 52 and a temporary cooling system 54. The main cooling system circulates a cooling fluid through the electrical machine and has a cold head unit 56 to refrigerate the cooling fluid to cryogenic temperatures. In the event that the cold head fails or is shut down for maintenance, the temporary cooling system performs the function of the coldhead unit and cools the cooling fluid circulating in the main cooling system.

A cryogen gas re-circulation cooling system 50 has been developed for a High Temperature superconducting (HTS) rotor. The cooling system includes a main system 52, e.g., a re-circulation cooling system, and a temporary cooling system 54. The main cooling system generally comprises a re-circulation compressor 58, a counter-flow heat exchanger 64, and a cold head unit 56. In the main cooling system, cryogen cooling fluid flows from the re-circulation compressor through the heat exchanger and a cold head unit (where the fluid is cooled to cryogenic temperatures) and then to the rotor 14 and its superconducting coil 36. Used cooling fluid is returned from the rotor, through the heat exchanger (where heat from the compressed cooling fluid passing to the rotor is transferred to the used gas) and circulates back through the re-circulation compressor and into the inlet line.

The temporary cooling system 54 may have a limited period of operation, such as several hours. The temporary cooling system is designed to cool the cooling fluid in the main system 52 for a period of time in excess of a reasonable time to repair and restart the cold head unit. Thus, the temporary cooling system allows for the continuous operation of the machine 10 even when a cold head unit temporary fails or is shut down.

The main cryogen cooling system 52 includes a re-circulation compressor 58 and cooling fluid storage tank 60 that provide cooling fluid and circulate the cooling fluid through the main system. The cryogen fluid in the re-circulation system is preferably helium but can also be nitrogen, neon, or hydrogen if the HTS rotor operating temperature will not fall below 77° K, 27° K, or 20° K respectively.

The main cooling system is a closed-loop system in that cooling fluid circulates through the main cooling system and the rotor and coil windings. The cooling fluid is under high pressure and is at or near ambient temperature, e.g., 300° K, as it leaves the re-circulation compressor and passes through an inlet line 62 between the compressor and a counter-flow heat exchanger 64. The return line 66 through which flows used cooling fluid returning from the machine 10 to the re-circulation compressor 58. The used cooling fluid in the return line passes through the heat exchanger is still relatively cold and has not been heated to ambient temperatures by the pressurization that occurs in the re-circulation compressor. The cold used cooling fluid is used to cool the cooling fluid leaving the compressor. The heat exchanger transfers heat in the cooling fluid flowing from the compressor to the used cooling fluid in the return line. Thus, the cooling fluid in the inlet line 62 leaves the heat exchanger at a substantially below ambient temperature.

The cooling fluid in the inlet line flows from the heat exchanger to a cooling coil coupling 68 with a cold head unit 56. The cooling fluid circulating in the main cooling system may be helium gas, nitrogen gas or liquid, neon gas or liquid, or hydrogen gas or liquid. The cooling fluid may be a liquid at the outlet of the cold head unit, and may return from the rotor as a gas. The cold head unit cools the cooling fluid in the inlet line to cryogenic temperatures, e.g., 30° K or below.

The cryogenic cooling fluid is supplied to the HTS generator at inlet temperature (Tin) to cool the HTS rotor winding. The return gas from the rotor exits at temperature (Tout) and proceeds through the counter-flow heat exchanger 64 to return to the re-circulation compressor 58.

The cooling fluid enters the rotor 14 as a liquid, and may evaporate as it flows through the cooling passages 38 of the rotor SC coil winding 34. The evaporation of the cooling fluid in the passages 38 cools the SC coils and ensures that the coils operate in superconducting conditions. The evaporated cooling fluid flows as a cold gas from the HTS rotor, through the return line 66. The return line is sized to pass the cold cooling gas from the rotor to the re-circulation compressor.

The cold head 56 unit may be a cryorefrigerator may be single stage Gifford-McMahon cryocooler or pulse tube with separate or integral cryocooler compressor with a re-condenser unit attached to the single stage. Single or multiple cryorefrigerator coldhead units (only one is shown in FIG. 3) may be used to cool the cooling fluid to cryogenic temperatures at the inlet (Tin) to the cooling passages in the rotor 14 and its SC windings 34.

A cold box 72 may surround and insulate the heat exchanger, cold head unit, and inlet and return lines to and from the rotor. The cold box insulates in a vacuum the cryogenic components of the main cooling system and minimizes heat transfer into the cooling system. The cold box may include vacuum jacketed cooling fluid lines and insulated components in the heat exchanger and cold head. The cold box extends to the cooling system coupling 26 to the rotor to ensure that heat is not unnecessarily transferred into the cooling system and to maintain cryogenic temperatures of the cooling fluid.

The inlet and return lines of the main cooling system are coupled to a cooling transfer coupling 26 at the rotor 14. In the transfer coupling and rotor, the cooling fluid passes through vacuum jacketed cooling passages in the end shaft 24 and through the cooling passages 38 around the SC coils 36. The cooling fluid maintains the SC coil 36 in the rotor at cryogenic temperatures by convection heat transfer or evaporative cooling and ensures that the coils operate in superconducting conditions.

Used cooling fluid, typically in the form of a cold gas, exits the cooling passage 38 of the coil, flows through the vacuum jacketed passages in the end shaft and through the cooling coupling 26 to exit the rotor 14. The return transfer line 66 provides a passage for the return cooling fluid from the rotor, through the heat exchanger 64, and to the re-circulation compressor 58. The inlet and return lines in the cold box 72 are vacuum jacketed and heavily insulated. The vacuum insulation of the inlet and return lines and by the cold box minimizes heat transfer losses in the cooling fluid as it circulates between the main cooling system and rotor. It is not necessary to vacuum jacket the lines between the cold box and re-circulation compressor. A flow valve 76 controls the flow of cooling fluid in the main cooling system 52.

The circulatory main cooling system 52 provides a steady supply of cooling fluid to the HTS rotor. Moreover, the circulatory main cooling system is economical in its construction and operation in that it does not require extensive redundant cooling systems. The overall reliability of the cooling system is enhanced by the temporary cooling system that continues providing cooling functions even if the cold head unit of the main cooling system fails. The reliability and economy of the cooling system facilitates the development of a commercially-viable synchronous machine with a HTS rotor.

The temporary cooling system 54 remains inactive while the main cooling system is fully operating, and particularly while the cold head unit 56 is operational. While inactive, the temporary cooling system does not cool the cooling fluid circulating through the main cooling system and is isolated from the main system by a flow valve 78 between the a cryogen storage tank 74 and a heat exchanger 82 that thermally couples the temporary cooling system 54 to the cooling fluid in the main system 52. The cryogen storage tank is a conventional long-term insulating storage tank for cryogenic fluids.

The temporary cooling system 54 includes a storage tank 74 of cryogenic cooling fluid 70 ("temporary cooling fluid"), fluid lines 80 extending from the storage tank to a second heat exchanger 82 thermally coupled to the inlet line 62 of the main cooling system, and a vent 84. The cooling fluid in the storage tank is separate from and does not mix with the recirculating cooling fluid in the main system. The temporary cooling fluid is stored in the tank until the temporary cooling system is activated, such as in response to a failure of the cold head unit of the main system.

During normal operation of the main cooling system, the cryogen fluid remains unused and at cryogenic temperatures in the temporary storage tank. If the HTS rotor is to be cooled to 80° K at the rotor coupling 26 (Tin), then liquid nitrogen may be used as the temporary cryogen fluid in the open circuit temporary cooling system. Liquid neon may be used as the cryogen fluid in the temporary storage tank if the HTS rotor is to be cooled to about 30° K at Tin, and liquid hydrogen or helium may be used as the cryogen fluid if the rotor is to be cooled to about 20° K at Tin.

When activated, temporary cooling fluid flows (drains) from the tank 74, through the fluid lines 80 and to the at least one heat exchanger 82 where the temporary cooling fluid cools to cryogenic temperatures the cooling fluid in the main system. The temporary cooling fluid may also flow through the heat exchanger 64 in the main system to cool the circulating cooling fluid as it leaves the re-circulating compressor in the main system. After passing through one or more heat exchangers, the temporary cooling fluid is exhausted by the vent 84 from the temporary cooling system. There is sufficient temporary cooling fluid in the storage tank for the temporary cooling system to operate for several hours in an open-loop mode. After operating in open-loop mode, additional temporary cooling fluid may be added to the storage tank to replenish the fluid used and vented during operation of the temporary system.

The temporary cooling system is switched on (by opening the isolation flow valve 78) when the cold head unit of the main cooling system fails or is otherwise shut-down, or during initial cool-down of the rotor where the demand for cooling is high or when some other extraordinary circumstance develops in the main cooling system such that the cooling fluid in the inlet line 62 to the rotor becomes over-heated and cannot adequately cool the SC windings 34 in the rotor 14. The isolation flow valve 78 may be manually operated or may be automatically opened by a computerized control system for the machine or cooling system.

The temporary cooling system 54 operates in an open-loop mode. In operation, cryogen fluid flows from the temporary storage tank via a cryogen line 80, through the open valve 78, and passes through a heat exchanger 82 the thermally couples the temporary cooling system to the circulating cooling fluid in the main cooling system. The temporary cooling heat exchanger 82 is isolated during normal operation, except for initial cool-down and during the shut down of the cooling components, such as a cold head unit failure. When cryogen fluid flows in one direction through the counter-flow heat exchanger it cools the inlet line 62 of the main cooling system and thereby transfers heat from the re-circulating cooling fluid to the cryogen fluid in the temporary cooling system.

The vent 84 releases the warmed cryogen fluid to the atmosphere or other environment, where warm cryogen fluid (e.g., hydrogen or helium gas) can be safely released. Vented cryogen liquid is replenished by refilling the storage tank after the main cooling system, such as the cold head unit, is back in normal operation. The cryogen fluid by passing through the temporary heat exchanger and the main counter-flow heat exchanger maintains the cryogenic operating temperature of the circulation cooling fluid in the main cooling system as that cooling fluid passes into the machine.

The temporary cryogen storage tank 74 has sufficient storage capacity to cryogenically cool the circulation cooling fluid, while the cold head unit 56 is shut down for maintenance or replacement. For example, the storage tank may have sufficient cryogen fluid, e.g., 100 liters, to cool the cooling fluid for a period of several hours, e.g., 5 to 10 hours, of normal machine 10 operation.

The temporary cooling system is a reliable, simple and inexpensive auxiliary cooling system. Redundant cold head units and other expensive redundant units are not needed in the cooling system. Excess normal cooling capacity is not needed for reliability because the temporary open circuit cooling system 54 has sufficient cooling capacity to allow the cold head unit to be shut down for maintenance or replacement without affecting the operation of the rotor. Accordingly, the HTS cooling system 50 (main cooling system 52 and temporary system 54) has high cooling reliability with low-cost, no-redundant components.

Figure 4:
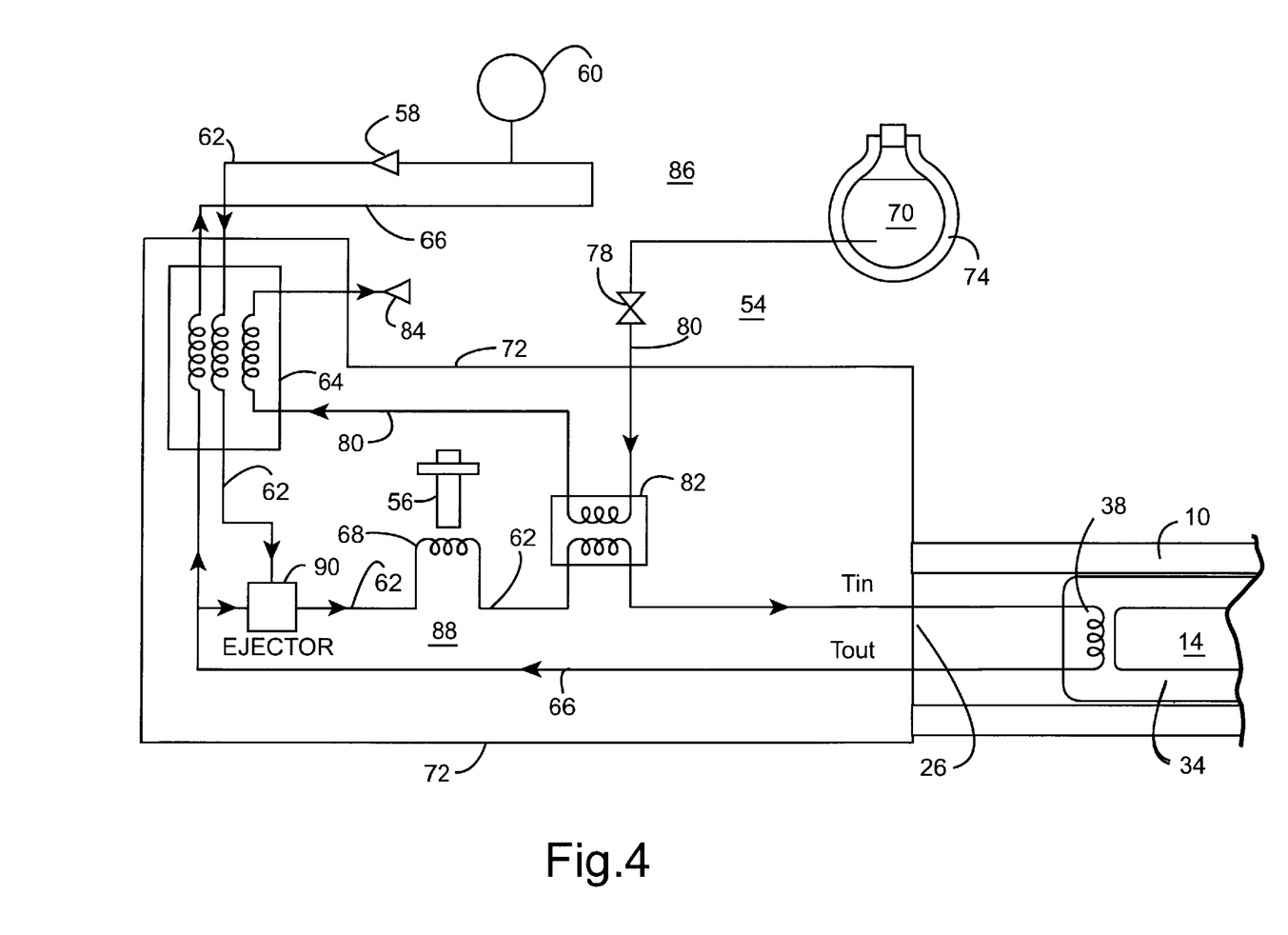
FIG. 4 is a schematic diagram of a second embodiment of a cryogenic cooling system.

FIG. 4 is a schematic diagram of a second embodiment of a cryogenic cooling system 86. The components in the second cooling system 86 that are common to the first cooling system 50 have been identified with common reference numbers in FIGS. 3 and 4. In particular, the temporary cooling system 54 in the second embodiment is conceptually the same as the temporary cooling system 54 in the first embodiment of the cooling system.

The main cooling system 88 shown in FIG. 4 further includes an ejector 90 that pumps used cooling fluid from the return line 66 into the inlet line 62. The cooling fluid that re-enters the inlet line from the return line through the ejector bypasses the re-circulation compressor 58 and heat exchanger 64. Thus, the fluid load on the compressor and heat exchanger is reduced when using the ejector. The ejector 90 allows for the use of a smaller heat exchanger and compressor in the main cooling system 88, than would be needed in a main cooling system 52 that does not have an ejector.

Figure 5:
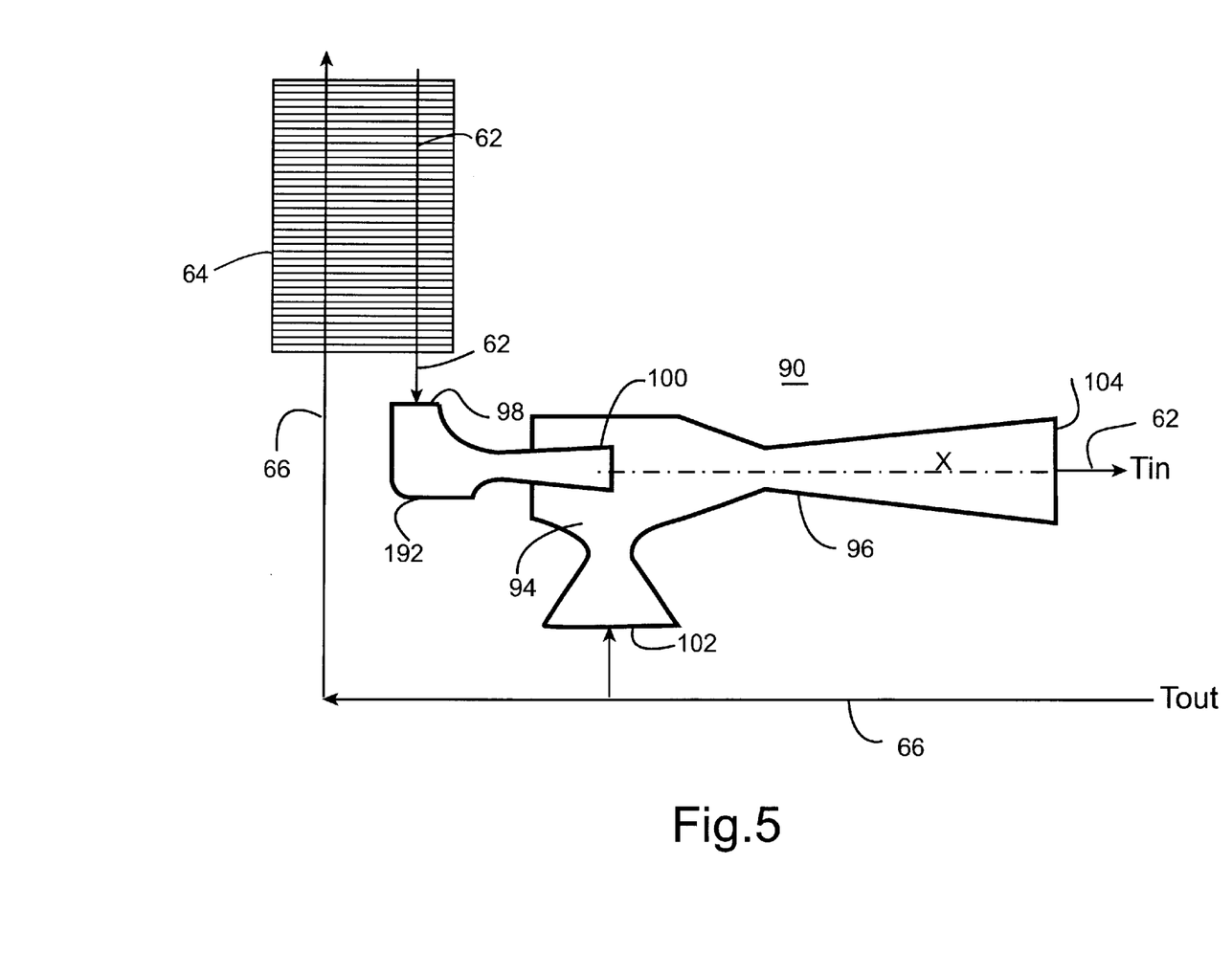
FIG. 5 is a schematic diagram of an ejector which is a component of the second embodiment.

FIG. 5 shows a detailed schematic diagram of the ejector 90 which is basically a static pump for cooling fluid. The ejector includes a first convergent-divergent nozzle 92, a diffuser zone 94 and a second convergent-divergent nozzle 96. The inlet 98 to the first nozzle is connected to the inlet line 62 and receives the high-pressure cooling fluid flow from the heat exchanger 64. As the high pressure flow passes through the first nozzle 92, the velocity of the flow substantially increases as it jets from the outlet 100 of the nozzle at a relatively low static pressure and into the diffuser 94. This low-pressure diffuser draws used cool fluid into the diffuser 94 from the return line 66 via the inlet port 102. The inlet port 102 may be aligned with the axis of a diffuser.

The used cooling fluid that enters port 102 is entrained in the diffuser 94 with the cool fluid jet from the first nozzle. Both streams of cooling fluid form a mixed cooling fluid stream that passes through a second convergent-divergent nozzle 96 having a relatively large diameter outlet 104. The second nozzle slows the jet stream from the first nozzle (which now includes the return fluid) and increases the pressure (to greater than the pressure in the diffuser and return line) of the stream as it re-enters the inlet line 62 at the outlet 104 of the ejector. The pressure of the coolant in the inlet line 62 downstream of the diffuser is sufficient to move the coolant through the cold head unit, rotor, SC coil windings and the return line.

A relatively-low volume, high pressure cooling fluid flow from the re-circulation compressor may be used to cause the ejector to pump a larger volume of fluid from the return line to the inlet line. In the inlet line, the high pressure flow stream from the heat exchanger 64 enters the first convergent-divergent nozzle 92. At the nozzle discharge 100 and in the diffuser 94, the fluid pressure of the stream is low and its velocity is high. The lower pressure in the diffuser causes used cooling fluid to flow into the ejector from the return line through inlet port 102.

The fluid momentum in the ejector is conserved (except for losses due to friction) as the cool fluid streams through the ejector. The high pressure of the inlet line coolant stream is converted to a high velocity stream in the first nozzle. The momentum of that stream along the axis of the ejector (x-axis) is conserved. The cooling fluid flow of return line entering the diffuser merges with the high velocity stream exiting from the first nozzle. The total momentum of the two streams is substantially the sum of the momentum each of the two streams along the ejector axis. This total momentum drives the merge stream through the second nozzle 96 which has a large diameter outlet 104 to convert stream velocity into pressure. The pressure of the outlet stream moves the cooling fluid in the inlet line downstream of the ejector, through the coil, rotor and return line.

The flow through the first nozzle 92 is typically a fraction of the flow being pumped through the ejector and the mixed flow exiting the extractor. The high pressure of the flow stream in the inlet line 62 from the heat exchanger creates sufficient momentum in a relatively low volume stream to draw a majority of the cooling fluid in the return line and to drive the mixed stream of cooling fluid from the ejector through the rest of the main cooling system 88.

Because a relatively-small flow of cooling fluid is needed at the first nozzle, the cooling fluid flow through the re-circulation pump and heat exchanger is only a fraction of the flow circulation of cooling fluid through the HTS rotor. As a result, the heat exchanger size is reduced considerably and its efficiency is not as critical to the efficiency of the overall main cooling system. Similarly, the re-circulation compressor may be small and require less power than would a compressor in a main system without an ejector. Thus, one benefit of using the ejector in the main system is the significant reduction in the size and cost of the heat exchanger and compressor, and higher system efficiency due to the reduction in the heat exchanger losses and in compressor power requirements.

While the invention has been described in connection with what is presently considered to be the most practical and preferred embodiment, it is to be understood that the invention is not to be limited to the disclosed embodiment, but on the contrary, is intended to cover all embodiments within the spirit of the appended claims.

What is claimed is:

1. A cooling fluid system for providing cryogenic cooling fluid to an apparatus, wherein said system includes a main cooling system and a second cooling system, said second cooling system comprising:
   a storage device having a first cryogenic fluid;
   at least one cooling coupling in fluid communication with the first cryogenic fluid flowing from the storage device and with a second cryogenic fluid flowing through the main cooling system, and
   said second cooling system has a first operational mode during which the first cryogenic fluid does not flow through the at least one cooling coupling, and a second operational mode during which the first cryogenic fluid does flow through the at least one cooling coupling,
   wherein said second cooling system is switched from the first operational mode to the second operational mode while said main cooling system is disabled.

2. A cooling fluid system as in claim 1 wherein said second cooling system further comprises a cryogen line providing a fluid passage for the first cryogenic fluid from the storage device to the cooling coupling, and said line includes a valve with a first valve position preventing flow of the first cryogenic fluid through the line, and a second valve position open to flow of the first cryogenic fluid through the line.

3. A cooling fluid system as in claim 2 wherein said second cooling system further comprises a vent at the outlet of said cryogen line.

4. A cooling fluid system as in claim 1 wherein said at least one cooling coupling is at least one heat exchanger.

5. A cooling fluid system as in claim 1 wherein said at least one cooling coupling is a first heat exchanger and a second heat exchanger, and wherein said first heat exchanger is operative in said second operational mode and inoperative in said first operational mode, and said second heat exchanger is operative in both the first and second operational modes.

6. A cooling fluid system as in claim 1 wherein the first cryogenic cooling fluid is selected from a group consisting of nitrogen, hydrogen, neon and helium.

7. A cooling fluid system coupled to a high temperature super-conducting rotor for a synchronous machine, said system comprising:
   a main cooling system further comprising:
   a re-circulation compressor;
   an inlet line providing a fluid passage for a second cooling fluid flowing from the re-circulation compressor to the rotor, wherein the inlet line passes through a cold head unit;
   a temporary cooling system further comprising:
   a storage tank for a first cryogen fluid;
   at least one heat exchanger in fluid communication with said storage tank and said inlet line, and
   a valve between the tank and at least one heat exchanger, said valve having an open position allowing the first cryogen fluid to flow from the tank to the at least one heat exchanger and a closed position isolating the first cryogen fluid from the at least one heat exchanger,
   wherein the open position of the valve is selected when the cold head unit is disabled and said closed position is selected when the cold head unit is operating to cool the second cryogen cooling fluid.

8. A cooling fluid system as in claim 7 wherein said main cooling system further comprises a return line providing a fluid passage for the second cooling fluid between the rotor and re-circulation compressor.

9. A cooling fluid system as in claim 7 wherein said temporary cooling system further comprises a cryogen line providing a fluid passage for the first cryogenic fluid from the storage device to the at least one heat exchanger.

10. A cooling fluid system as in claim 9 wherein said second cooling system further comprises a vent at an outlet of said cryogen line.

11. A cooling fluid system as in claim 7 wherein said at least one heat exchanger is a first heat exchanger and a second heat exchanger, and wherein said first heat exchanger is operative in said second operational mode and inoperative in said first operational mode, and said second heat exchanger is operative in both the first and second operational modes.

12. A cooling fluid system as in claim 7 wherein the first cryogenic cooling fluid is selected from a group consisting of nitrogen, hydrogen, neon and helium.

13. A method for cooling a super-conducting machine using a main cooling system and a temporary cooling system, comprising the steps of:
   a. storing a first cryogenic cooling fluid in said temporary cooling system;
   b. circulating a second cryogenic cooling fluid between said main cooling system and said machine to cryogenically cool superconducting components of the machine;
   c. cooling the second cryogenic cooling fluid with a cooling unit in said main cooling system and at the same time thermally isolating the first cryogenic cooling fluid from said second cryogenic cooling fluid;
   d. while said cooling unit is disabled, allowing the first cryogenic cooling fluid to cryogenically cool the second cooling fluid.

14. A method as in claim 13 wherein said second cryogenic cooling fluid is circulated through the machine continually during operation of the machine.

15. A method as in claim 13 further comprising the step of venting the first cryogenic cooling fluid after cooling the second cooling fluid.

16. A method as in claim 13 wherein said temporary cooling system comprises a storage tank and at least one heat exchanger, and wherein said first cryogenic cooling fluid is stored in the tank and cools the second cryogenic cooling fluid when flowing through the at least one heat exchanger.

17. A method as in claim 16 wherein said at least one heat exchanger is a first heat exchanger and a second heat exchanger, and wherein said first heat exchanger is operative during step (c) and inoperative during step (d), and said second heat exchanger is operative in steps (c) and (d).

18. A method as in claim 13 wherein the first cryogenic cooling fluid is selected from a group consisting of nitrogen, hydrogen, neon and helium.

19. A method for cooling a super-conducting winding in a rotor using a main cooling system and a temporary cooling system, comprising the steps of:
   a. storing a first cryogenic cooling fluid in said temporary cooling system;
   b. circulating a second cryogenic cooling fluid between said main cooling system and said machine to cryogenically cool the superconducting winding of the machine;
   c. cooling the second cryogenic cooling fluid with a cooling unit in said main cooling system and while the rotor is in a normal operating mode thermally isolating the first cryogenic cooling fluid from said second cryogenic cooling fluid;
   d. while said rotor is in a cool down mode, allowing the first cryogenic cooling fluid and the cooling unit to both cryogenically cool the second cooling fluid.

20. A method as in claim 19 wherein said second cryogenic cooling fluid is circulated through the rotor continually during operation of the machine.

21. A method as in claim 19 further comprising the step of venting the first cryogenic cooling fluid after cooling the second cooling fluid.

22. A method as in claim 19 wherein said temporary cooling system comprises a storage tank and at least one heat exchanger, and wherein said first cryogenic cooling fluid is stored in the tank and cools the second cryogenic cooling fluid when flowing through the at least one heat exchanger.

23. A method as in claim 22 wherein said at least one heat exchanger is a first heat exchanger and a second heat exchanger, and wherein said first heat exchanger is operative during step (c) and inoperative during step (d), and said second heat exchanger is operative in steps (c) and (d).

24. A method as in claim 19 wherein the first cryogenic cooling fluid is selected from a group consisting of nitrogen, hydrogen, neon and helium.

\* \* \* \* \*